United States Patent [19]

Saotome

[11] Patent Number: 4,995,517

[45] Date of Patent: Feb. 26, 1991

[54] MECHANISM FOR SUPPRESSING VIBRATIONS OF TRAVELLING CRANE

[75] Inventor: Yoshimi Saotome, Takasago, Japan

[73] Assignee: Kabushiki Kaisha Kobe Seiko Sho, Kobe, Japan

[21] Appl. No.: 516,731

[22] Filed: Apr. 30, 1990

[30] Foreign Application Priority Data

Oct. 14, 1989 [JP] Japan ................................ 1-267771

[51] Int. Cl.[5] ...................... B66C 13/06; B66C 23/26; F16D 31/62

[52] U.S. Cl. .................................. 212/146; 212/182; 60/413; 91/437

[58] Field of Search ............... 212/146, 149, 152, 153, 212/157, 159, 182, 223, 230–232, 238, 255, 261, 264; 60/413, 416; 91/437

[56] References Cited

U.S. PATENT DOCUMENTS

| | | | |
|---|---|---|---|
| 3,814,265 | 6/1974 | Miller | 212/238 |
| 3,922,854 | 12/1975 | Coeurderay | 60/413 |
| 4,046,270 | 9/1977 | Baron et al. | 60/413 |
| 4,085,587 | 4/1978 | Garlinghouse | 60/413 |
| 4,142,368 | 3/1979 | Mantegani | 60/413 |
| 4,367,673 | 1/1983 | Krueck et al. | 91/437 |
| 4,674,638 | 6/1987 | Oliphant | 212/182 |

*Primary Examiner*—Joseph F. Peters, Jr.
*Assistant Examiner*—R. B. Johnson
*Attorney, Agent, or Firm*—Oblon, Spivak, McClelland, Maier & Neustadt

[57] ABSTRACT

A mechanism for effectively suppressing vibrations in travel of mobile type crane includes; a boom lifting hydraulic cylinder connected between a vehicle body of the mobile crane and a boom; a main hydraulic pump; a direction control valve for supplying the discharge oil of the main hydraulic pump selectively to and from a first load-supporting oil chamber and an opposingly located second oil chamber of the boom lifting cylinder. A vibration suppressing accumulator is connected between the boom lifting cylinder and the direction control valve; a first change-over valve is selectively switchable between a travel mode position for forming a closed circuit through the first and second oil chambers and a working mode position for supplying the oil pressure independently to and from the first and second oil chambers; a second change-over valve is selectively switchable between a travel mode position for communicating the accumulator with the closed circuit and a working mode position for blocking oil flow from the closed circuit to the accumulator. Also provided are; a boom position detectors; a first selector for switching on and off oil pressure supply to the second oil chamber from an auxiliary oil pressure source; and a second selector for switching on and off oil pressure supply to the accumulator from an auxiliary oil pressure source.

1 Claim, 4 Drawing Sheets

MECHANISM FOR SUPPRESSING VIBRATIONS OF TRAVELLING CRANE

BACKGROUND OF THE INVENTION

1. Field of the Invention

This invention relates to a mechanism for suppressing vibrations in travel of a mobile or travelling crane like a rough terrain crane.

2. Description of the Related Art

As shown particularly in FIG. 4, mobile cranes generally have a boom 3 rotatably supported on a vehicle body 2, which is supported on vehicle wheels, for rotation about a horizontal shaft 5 through operation of a boom lifting cylinder 3. This sort of mobile crane has a problem that the vibrations to which the vehicle body 2 is subjected during travel due to undulations on the road surfaces or abrupt accelerations or decelerations of the vehicle are augmented by vertical oscillatory movements of the boom 3 or other attachments, giving an uncomfortable feeling to the operator.

As means for suppressing such vibrations during travel, there has been known in the art an apparatus as described in Japanese Laid-Open Patent Application No. 59-18295, which is constituted, as shown in FIG. 5, by a damper mechanism 19 provided within a boom lifting hydraulic cylinder 18, a counter-balancing valve 12 provided in a conduit 13 in communication with an oil chamber 181 which holds the load of the cylinder 18, and an electromagnetic selector valve 16, a shuttle valve 15 in communication with the conduit 13, a conduit connected to the other oil chamber 182 and a conduit connected to a direction control valve 11.

According to this apparatus, if the direction control valve 11 is switched to a boom-up or boom-down position during crane operation with a selector valve 16 in position a, the discharge oil of a pump 10 is fed to the oil chamber 181 or 182 of the cylinder, thereby expanding or contracting the cylinder 18 to lift up or down the boom. For a vehicle travelling operation, the change-over valve 16 in position a is switched to position b after setting the fore end of the boom in an appropriate travel position at a height of $H_1$ from the road surface by contracting the cylinder 18. As a result, the conduit 13 is communicated with the conduit 17 through the change-over valve 16 and the shuttle valve 15, forming a closed circuit through the oil chambers 181 and 182 and the damper mechanism 191 to introduce and accumulate, in the damper mechanism 191, the load pressure acting in the oil chamber 181 of the cylinder 18, thereby to produce the vibration damping effect while the crane is in travel.

In order to provide the damping action effectively in this sort of mobile crane, it is necessary to set the boom 3 at a suitable height $H_1$ during travel, more specifically, at a height $H_1$ which is higher than a lower limit $H_0$ but lower than an upper limit $H_2$ which is stipulated in traffic regulations with regard to travels on public roads, namely, at a height of $H_0<H_1<H_2$. Besides, the load-suspending hook has to be fixed to the vehicle body while holding the hoisting rope in an appropriately loosened state.

However, in case of the above-described known apparatus, the operator has to switch the direction control valve 11 and adjust the height of the boom 3 through expansion or contraction of the cylinder 18 while watching the height of the boom 3. This is very troublesome and causes tremendous mental fatigue. In addition, the boom height adjustment is often inaccurate, resulting in insufficient vibration damping actions due to a boom position which is too low or exceeds the upper limit height $H_2$. Further, there are possibilities of an unloosened hoisting rope restraining the oscillatory movements of the boom which are necessary for the suppression of vibrations in travel, failing to produce the expected vibration suppressing effects. Further, a hoisting rope which is in an excessively loosened state might be swung to and fro, or a hook might hit against the vehicle body, producing uncomfortable noises.

SUMMARY OF THE INVENTION

It is an object of the present invention to eliminate the above-mentioned problems of the known apparatus, namely, to provide a mechanism for suppressing vibrations of mobile crane, which can facilitate the initial setting of the boom in the travel position, including the adjustments of the boom height, tension of the hoisting rope and accumulator pressure.

It is another object of the present invention to provide an mechanism for suppressing vibrations in travel of mobile crane, which permits one to set a boom accurately at a height for travel with a hoisting rope in an appropriately loosened state, thereby providing the vibration suppressing action appropriately while reducing noises as caused by swinging motions of the hoisting rope or vibrations of the hook.

For achieving the above-stated objects, the apparatus according to the invention includes: a boom lifting hydraulic cylinder connected between a vehicle body of mobile crane and a boom; a main hydraulic pump; a direction control valve for supplying the discharge oil of the main hydraulic pump selectively to and from a first load-supporting oil chamber and an opposingly located second oil chamber of the boom lifting cylinder; a vibration suppressing accumulator connected between the boom lifting cylinder and the direction control valve; a first change-over valve selectively switchable between a travel mode position for forming a closed circuit through the first and second oil chambers and a working mode position for supplying the oil pressure independently to and from the first and second oil chambers; a second change-over valve selectively switchable between a travel mode position for communicating the accumulator with the closed circuit and a working mode position for blocking oil flow from the closed circuit to the accumulator; a boom position detecting means; a first selector means for switching on and off oil pressure supply to the second oil chamber from an auxiliary oil pressure source; and a second selector means for switching on and off oil pressure supply to the accumulator from the auxiliary oil pressure source.

According to another aspect of the invention, the apparatus of the invention further includes: a mode selector switch; and a control means adapted to switch the above-mentioned first selector means in response to a signal from the detection means to supply a predetermined amount of oil pressure to the second oil chamber until a pressure level corresponding to the pressure in the first oil chamber is reached, and then to switch the first and second change-over valves successively to form the closed circuit and communicate the accumulator with the closed circuit, thereafter switching the second selector means to supply oil pressure to the accumulator to accumulate therein a pressure corresponding to the pressure in the first oil chamber and maintaining the closed circuit and accumulator in communication with each other.

Preferably, the above-mentioned first selector means for switching on and off the oil pressure supply from the auxiliary oil pressure source to the second oil chamber and the second selector means for switching on and off the oil pressure supply from the auxiliary oil pressure source to the accumulator are in the form of a three-position change-over valve having a first position for supplying oil pressure to the second oil chamber, a second position for supplying oil pressure to the accumulator and a neutral position suspending the oil pressure supply to both of the second oil chamber and accumulator.

With the above arrangement, the boom is contracted to a basic length (fully contracted state) prior to a travelling operation, and, after lifting the boom to an approximately maximum angle position, the hook is engaged on the vehicle body. The boom is then lowered to a level (a preset level) corresponding to or slightly higher than the upper limit height, followed by adjustment of the hoisting rope tension. Thereafter, by switching the above-mentioned change-over valves and selector means, the boom is accurately set at the height for travel with the hoisting rope in an appropriately loosened state to ensure appropriate vibration suppressing action of the damper mechanism while reducing the noises which would otherwise result from swinging motions of the hoisting rope or vibrations of the hook during travel. In addition, the control means permits one to automate the adjustment of the boom to the height for travel as well as the initial setting of the accumulator pressure.

The above and other objects, features and advantages of the invention will become apparent from the following description and the appended claims, taken in conjunction with the accompanying drawings which show by way of example preferred embodiments of the invention.

DESCRIPTION OF THE PREFERRED EMBODIMENT

Figure 1:
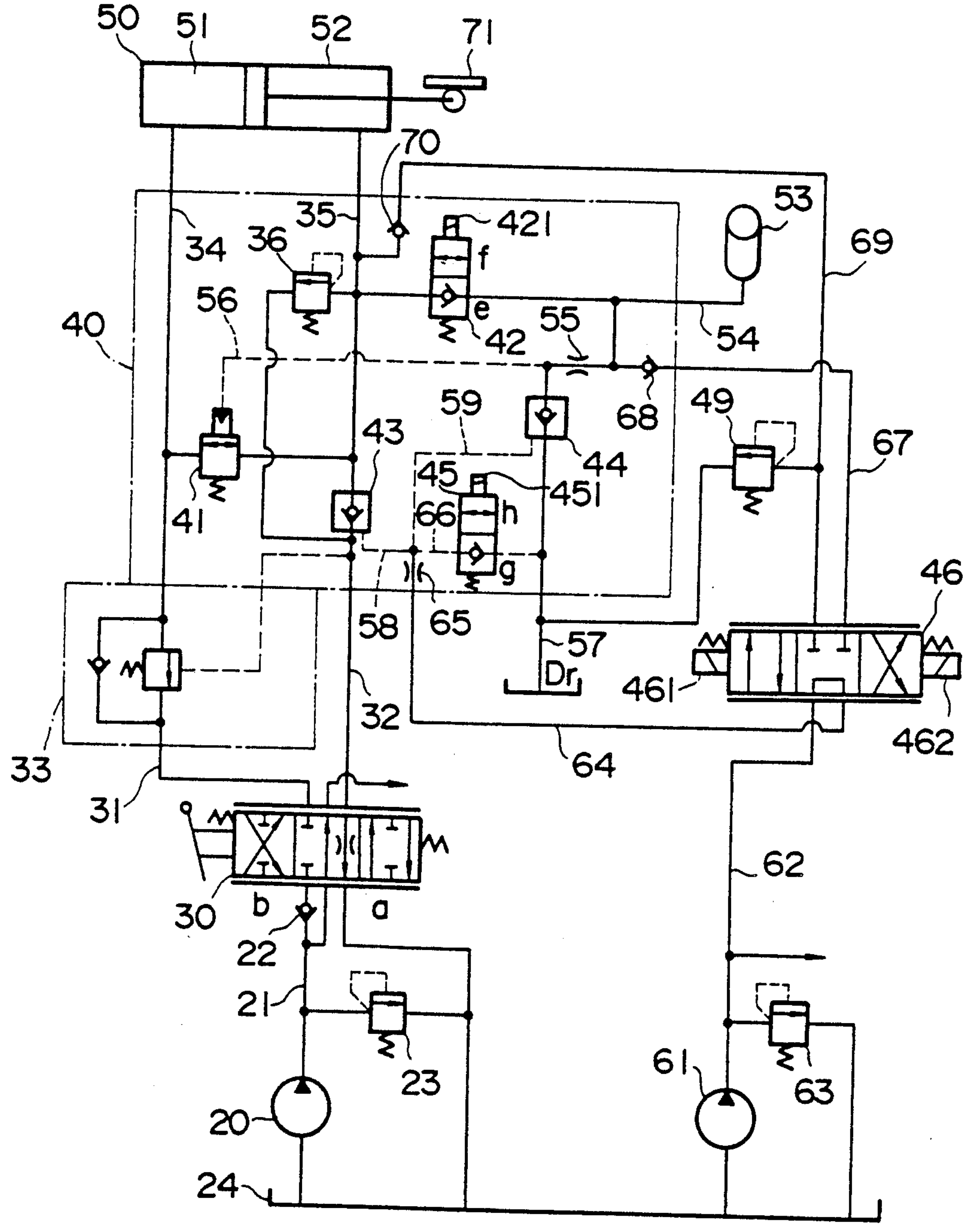
FIG. 1 is a diagram of a hydraulic circuit embodying the present invention.
Figure 4:
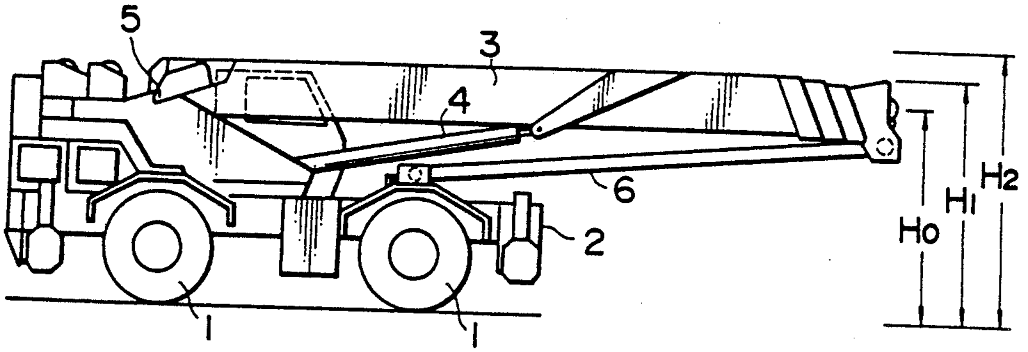
FIG. 4 (PRIOR ART)
FIG. 4 is a schematic side view of a mobile crane.
Figure 5:
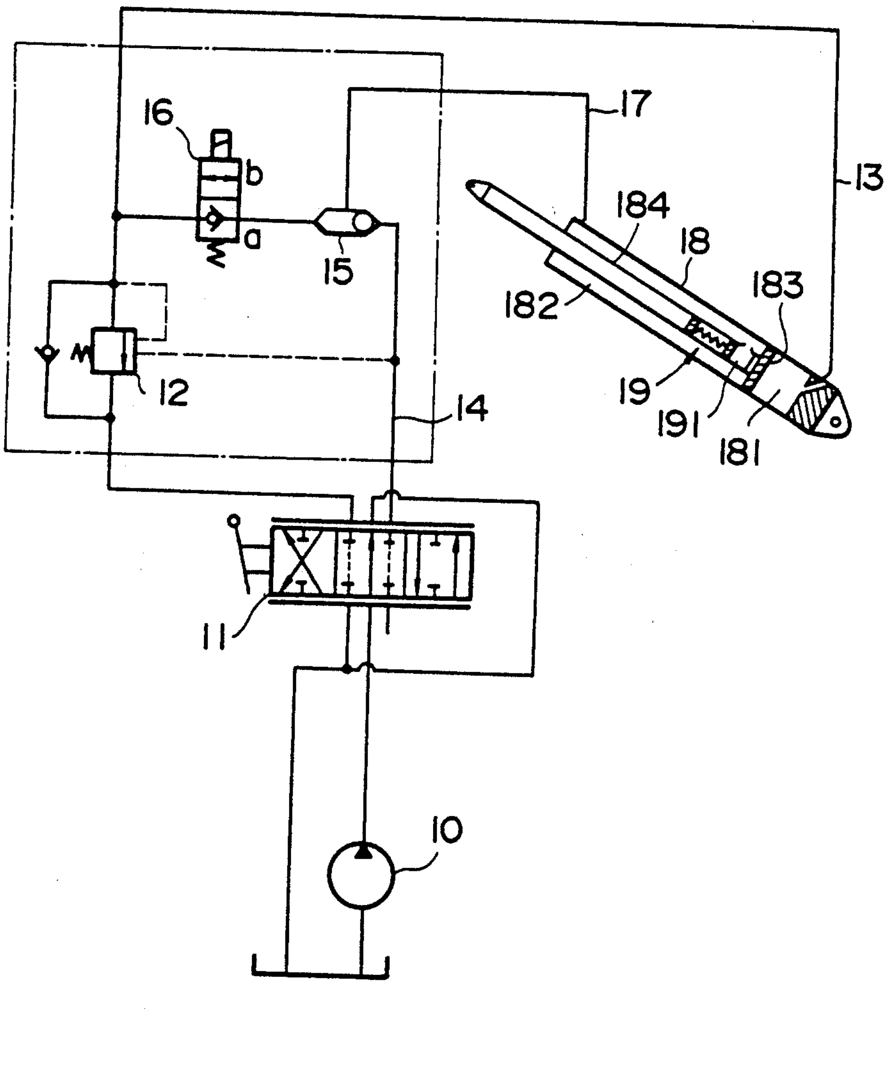
FIG. 5 (PRIOR ART)
FIG. 5 is a diagram of a conventional hydraulic circuit.

Referring to FIG. 1, there is shown an embodiment of the present invention, in which a conduit 21 on the discharge side of a main hydraulic pump 20 is connected to a check valve 22 and a main relief valve 22, and further to a boom lifting cylinder 50 (corresponding to the cylinder 4 in FIG. 4) through a direction control valve 30, conduits 31 and 32, a counter-balancing valve 33 and a mode selector mechanism 40.

The mode selector mechanism 40 is constituted by valves 41 to 45. The first change-over valve 41 is a sequence valve which is connected between a conduit 34 in communication with a first oil chamber 51 and a conduit 35 in communication with a second oil chamber 52 of the cylinder 50 and functions to communicate the conduits 34 and 35 with each other when the pressure acting on its signal receiving portion is higher than a predetermined level, otherwise blocking the communication between these conduits. The pressure charged in an accumulator 53 is applied to the signal receiving portion of the valve 41 through accumulator conduit 54, throttle 55 and pilot conduit 56. The valve 41 may be in the form of a two-position change-over valve which is selectively switchable between a check position for blocking oil flows from conduit 34 to conduit 35 while permitting reverse flows and a position for freely communicating the two conduits 34 and 35 with each other.

The second change-over valve 42 is selectively switchable between position e for permitting oil flows from conduit 54 to conduit 35 while blocking reverse oil flows, and position f for freely communicating the conduits 35 and 54 with each other. First pilot check valve 43 is so positioned as to permit oil flows from conduit 32 to conduit 35 and to block the reverse flows, while second pilot check valve 44 is so positioned as to block oil flows from conduit 54 to drain conduit 57 and to permit the reverse oil flows. Pilot conduits 58 and 59 which respectively open the pilot check valves 43 and 44 are connected to conduit 64 through a throttle 65.

The third change-over valve 45 is selectively switchable between position g for blocking oil flows to the drain conduit 57 from pilot conduit 66 which is in communication with the above-mentioned conduits 58 and 59, and position h for communicating the conduits 66 and 57 with each other.

The hydraulic circuit further includes a replenishing change-over valve 46 which functions to replenish oil pressure to the second oil chamber 52 of the cylinder 50 (first selector means) and to the accumulator 53 (second selector means and which is selectively switchable to a neutral position for communicating a conduit 62 on the discharge side of an auxiliary hydraulic pump 61 (an auxiliary pressure source) with the conduit 64 while blocking communication between conduits 67 and 69, a left position for communicating the conduit 62 and 67 with the conduit 69 and 64, respectively, and a right position for communicating the conduits 62 and 69 with the conduits 67 and 64, respectively. The conduit 67 is communicated with the conduit 54 through a check valve 68, while the conduit 69 is communicated with the conduit 35 through a check valve 70. The check valve 68 may be provided within the change-over valve 46 if desired. The conduit 64 may be directly connected with the conduit 62, bypassing the change-over valve 46.

Pressure relief valves 23, 36 and 49 are respectively provided for the conduits 21, 35 and 69.

Figure 2:
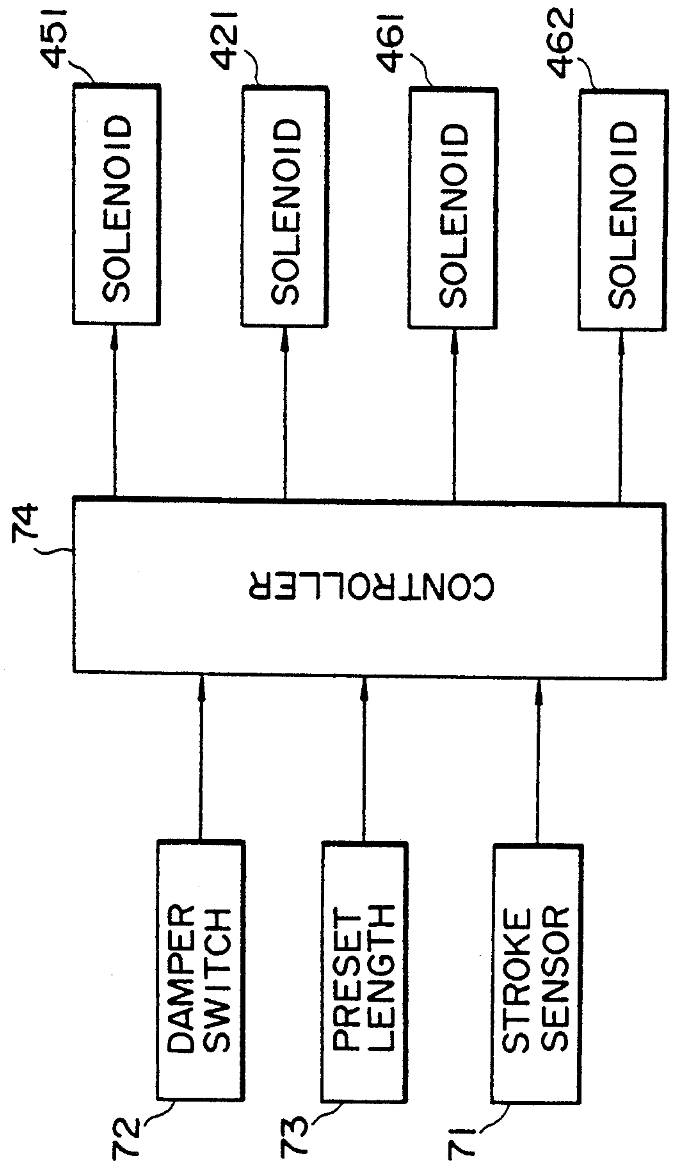
FIG. 2 is a block diagram of a controller for the hydraulic circuit.

The above-mentioned change-over valves 42, 45 and 46 are electromagnetic change-over valves which are switched, for example, by operation of a control means as shown in FIG. 2.

In FIG. 2, indicated at 72 is a damper switch (a mode selector switch) which selects the travel mode when turned on and the working mode when off. The reference 71 indicates a stroke sensor which is mounted on the cylinder 50 for detection of the boom position. Indicated at 73 is a length setting device which stores an upper limit value of the appropriate length for travel. The length detected by the stroke sensor 71 is compared with the preset value in the length setting device 73, sequentially energizing the solenoids 421, 451, 461 and 462 of the change-over valves 42, 45 and 46 according to the detected length.

With the above arrangement, the damper switch 72 is turned off (working mode) to perform a crane operation, de-energizing the solenoids 421, 451, 461 and 462 to retain the change-over valves 42, 45 and 46 in the positions shown in the drawing. Consequently, the discharge oil pressure of the auxiliary hydraulic pump 61, which is regulated by the auxiliary relief valve 63, is supplied to the pilot conduits 58 and 59 through the conduits 62 and 64 and the throttle 65 to open the pilot check valves 43 and 44, respectively. The accumulated pressure in the accumulator 53 is drained to the tank 24 through the throttle 55 and pilot check valve 44 to retain the sequence valve 41 in blocking state.

In this state, upon switching the direction control valve 30 into the boom-up position a, the discharge oil of the first hydraulic pump 20 is supplied to the first oil chamber 51 of the cylinder 50 through the counter-balancing valve 33 thereby stretching the cylinder 50 to upturn the boom. Since the first pilot check valve 43 is in open state at this time, the oil pressure which is discharged from the second oil chamber 52 by the expansion of the cylinder 50 is returned to the tank 24 past the pilot check valve 43 and through the direction control valve 30. If the direction control valve 30 is switched to the boom-down position b, the discharge oil from the pump 20 is conversely supplied to the second oil chamber 52 through the main pilot check valve 43, opening the counter-balancing valve 33. As a result, the oil in the first oil chamber 51 is returned to the tank 24 as the cylinder 50 is contracted, thereby lowering the boom.

In case of a vehicle travelling operation, a boom stretching hydraulic cylinder which is not shown in the drawing is firstly contracted in the working mode to its basic length or substantially to a fully contracted state. Then, the boom uplifting hydraulic cylinder 50 is once expanded to lift up the boom to an approximately maximum angle position, and the hook is engaged on the vehicle body 2 with a suitable degree of slack. Nextly, the cylinder 50 is contracted to lower the boom 3 while winding up the hoisting rope of FIG. 4 to adjust its length. At this time, the length of the cylinder 50 is detected by the stroke sensor 71, actuating an alarm (not shown) as soon as the detected length reaches a preset value in the length setting device 73. On confirming the alarm, the direction control valve 30 is returned to the neutral position by the operator, stopping the cylinder 50 once at the preset length. As a result, the boom 3 is stopped in a preset position or in a position corresponding to or slightly higher than the upper limit $H_2$ of the appropriate range for travel.

Thereafter, the damper switch 72 is turned on (travel mode) whereupon the solenoid 451 is energized to switch the change-over valve 45 into position h. Consequently, the pilot conduits 58, 59 and 66 are communicated with the drain conduit 57, closing both of the pilot check valves 43 and 44. In an initial period immediately after the switch to the travel mode, the pressure of the accumulator 53 is at the level of the tank pressure and below a preset level, so that the sequence valve 41 still remains in the blocking state.

Then, the solenoid 461 is energized to switch the change-over valve 46 into the left position (first selector means), supplying the discharge oil of the auxiliary hydraulic pump 61 to the second oil chamber 52 of the cylinder 50 through the check valve 70 to elevate the pressure in the oil chamber 52 (pre-charging) to a level corresponding to the pressure load pressure) in the first oil chamber 51, and after the pre-charging the solenoid 461 is de-energized to return the change-over valve 46 to the neutral position. After this, the solenoid 462 is energized to switch the change-over valve 46 to the right position (second selector means). As a result, the discharge oil of the auxiliary hydraulic pump 61 is applied to the pilot conduit 56 through the check valve 68 and throttle 55. As the applied pressure becomes higher than a predetermined level, the sequence valve 41 is switched into open state, communicating the conduits 34 and 35 to form a closed circuit. At this time, the pressure oil from the pump 61 also flows into the accumulator 53 but it does not amount to pressure accumulation of any sufficient extent because of the compressibility of the gas in the the accumulator 53.

Thereafter, the solenoid 462 is de-energized to block the communication between the conduit 67 and 69 (with the change-over valve 45 still in position h), and the solenoid 421 is energized to switch the change-over valve 42 into the upper position. As a result, the pressurized oil in the closed circuit is permitted to flow into the accumulator 53. At this time, the oil in the first oil chamber 51 flows out, causing the cylinder 50 to contract from the preset length in the initial stage of control to the targetted appropriate travel length, lowering the boom 3 from the preset height $H_2$ in the initial stage of control to the targetted appropriate travel height $H_1$. In this instance, by setting a value in the length setting device 73 in consideration of the capacity of the accumulator 53, the boom 3 can be automatically adjusted to the target height $H_1$ as the change-over valve 42 is switched. Further, abrupt contraction of the cylinder 50, which would be caused by the oil pressure flowing out toward the accumulator 53, can be prevented by intermittent on-off of the change-over valve 42.

After lowering the boom 3 to the target height $H_1$, the solenoid 421 is de-energized to return the change-over valve 42 to the lower position. Then, the solenoid 462 is energized again to supply the pressure oil from the pump 61 to the conduit 67 for storing pressure in the accumulator 53 to a preset level (corresponding to the pressure in the first oil chamber 51). At this time, the accumulator 53 is in communication with the closed circuit through the change-over valve 42 in position e, so that, as soon as the preset level is reached, the cylinder 50 is expanded by the pressure oil flowing into the closed circuit from the pump 61. Accordingly, the time point when the cylinder 50 begins to expand is the terminal point of the pressure accumulation in the accumulator 53, and the solenoid 462 is de-energized at that time point to return the change-over valve 46 to the neutral position.

As a result, the cylinder 50 is retained at the upper limit of the appropriate travel length range to hold the boom 3 at the target height (appropriate height for travel) $H_1$, while pressure has been built up in the accumulator 53 to equalize the accumulator pressure with the pressure in the closed circuit, completing the initial setting for travel. At this time, the hoisting rope 6 has been maintained in an appropriately loosened state.

The above-mentioned change-over valves 45, 42 and 46 may be switched manually by an operator or may be switched sequentially in the above-described timing in response to signals from the controller as shown in FIG. 2. In the latter case, the pressure accumulation in the accumulator 53 and the adjustment of the boom height are effected automatically simply by turning the damper switch 72 into the travel mode position.

Now, the solenoid 421 is energized again to switch the change-over valve 42 into position f and, with the accumulator 53 in communication with the closed circuit, the vehicle 1 is driven and started by operation of a vehicle drive mechanism which is not shown in the drawing. In travel, when the vehicle body 2 is vibrated due to undulations on road surfaces or as a result of abrupt acceleration or deceleration, the boom 3 which is shaken up and down with the vehicle vibration tends to expand and contract the cylinder 50. On such occasions, since the opposing oil chambers 51 and 52 of the cylinder 50 are communicated with each other, the pressure fluctuations resulting from the expansion and contraction of the cylinder 50 are suppressed by pressure losses in the accumulator and the conduits of the closed circuit, and the feeling of the vehicle drive is improved significantly by this vibration suppressing action. The hoisting rope 6 which is in an appropriately loosened state has no possibility of imposing adverse effects on the vibration suppressing action. Besides, should an abnormal pressure increase occur to the closed circuit, especially, to the first oil chamber 51 during travel, for example, when the vehicle rides on a rock on the road surface, the relief valve 36 operates to relieve the oil in the closed circuit to the outside of the system for protection of the associated components.

When it is desired to perform a crane operation after a travel, the damper switch 72 is turned off (the working mode), whereupon the solenoids 421, 451, 461 and 462 are all de-energized to return the respective change-over valves 42, 45 and 46 into the positions shown in the drawing. The crane is now in condition for performing a crane operation as described hereinbefore.

Figure 3:
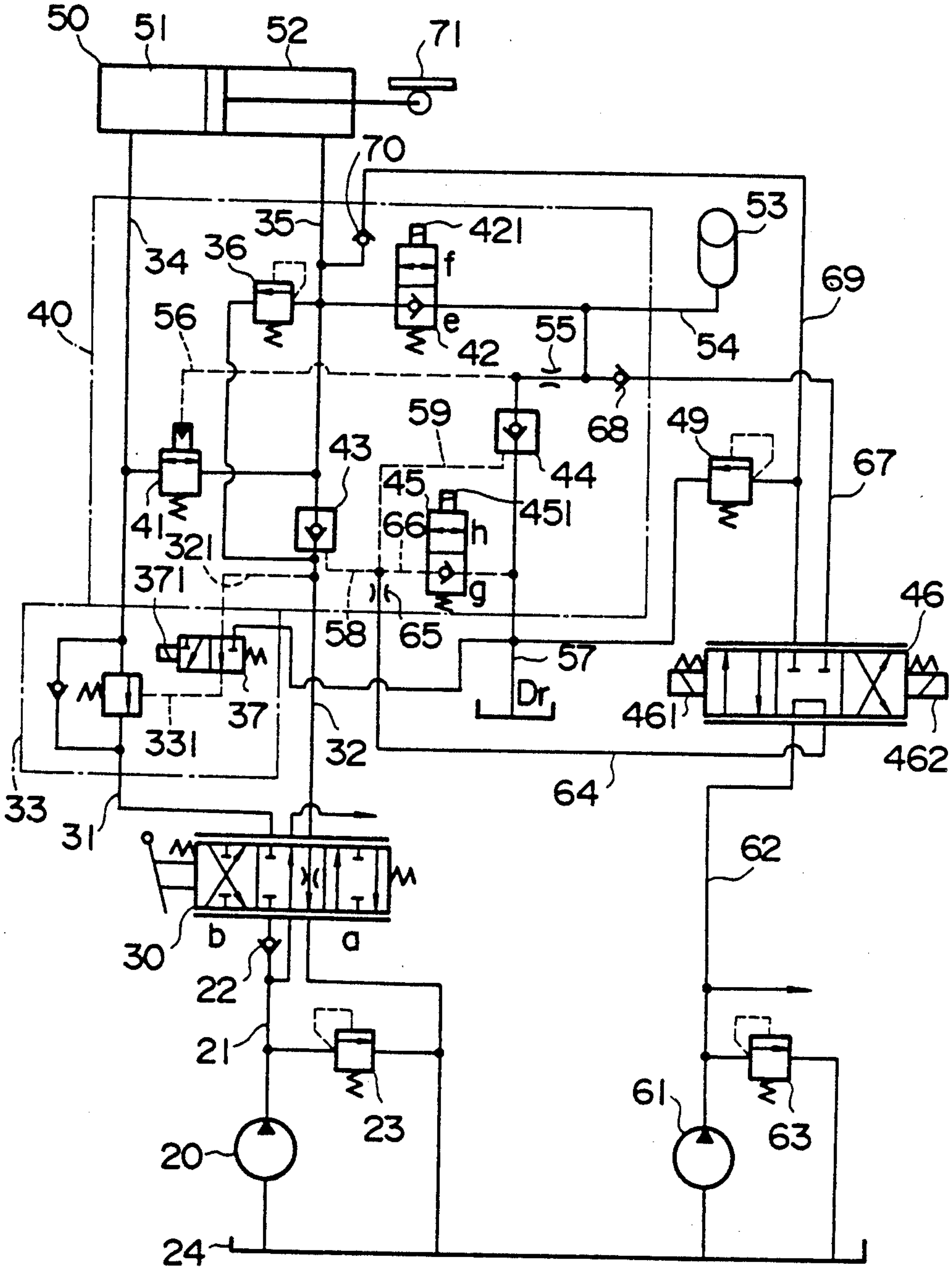
FIG. 3 is a diagram of a hydraulic circuit in another embodiment of the invention.

Illustrated in FIG. 3 is an embodiment for automaticaly stopping the boom 3 in the initial setting operation instead of the manual operation by the operator. In this embodiment, a further electromagnetic change-over valve 37 is provided between the pilot conduits 331 and 321 of the counter-balancing valve 33. As the cylinder 50 is contracted from the expanded state in the initial setting of the boom 3, the solenoid 371 of the electromagnetic change-over valve 37 is energized at a time point when the cylinder reaches the preset length in the setting device 73, thereby communicating the pilot conduit 331 of the counter-balancing valve 33 with the drain conduit 57 leading to the tank 24. As a result, the counter-balancing valve 33 is closed, automatically stopping the contraction of the cylinder 50, namely, automatically stopping the boom 3 at or slightly higher than the preset level or the upper limit value $H_2$ of the appropriate travelling height range.

Thereafter, as the boom uplifting lever is manipulated to return the direction control valve 30 to the neutral position, this is detected by a limit switch or other suitable sensor means and thereby the solenoid 371 is de-energized to return the electromagnetic change-over valve 37 to the position shown in the drawing. In this instance, when it is intended to lower the boom 3 to the lowermost position, the boom uplifting lever is once returned to the neutral position after the automatic stop, followed by a boom lowering operation.

In case of a vehicle travelling operation, the damper switch 72 is turned on after the automatic stop of the boom in the same manner as in the preceding embodiment. By so doing, the change-over valves 45, 46 and 42 are switched successively to hold the boom 3 at the target height $H_1$ (at the appropriate travel height), while storing a predetermined pressure in the accumulator 53 to complete the initial setting for the travelling operation.

The embodiment of FIG. 3 which automatically stops the boom 3 in the initial setting operation contributes to lessen the fatigue of the operator and to improve the accuracy of the initial setting operation.

The present invention can be embodied in other forms. For example, instead of detecting the position of the boom 3 by way of the stroke length of the cylinder 50 as in the foregoing embodiment, an approaching switch or limit switch may be mounted on the cylinder 50 in such a manner as to be turned on when the cylinder length is smaller than the upper limit value of the appropriate travel length, sequentially switching the change-over valves 45, 42 and 46 in the above-described timing, and otherwise to be held in off state. Alternatively, for switching these valves, there may be employed, in combination with a timer, a pressure switch which is arranged to detect the pressure in the closed circuit or accumulator. Similar control is possible through detection of the angle of the boom 3.

The timing for switching the change-over valves 45, 42 and 46 is determined depending upon the discharge flow rate of the auxiliary pump 61, the capacity of the accumulator 53, capacities of the two oil chambers 51 and 52 of the cylinder 50 and the flow rate necessary for adjusting the cylinder 50 into the appropriate travel length.

As clear from the foregoing description, the present invention contributes to facilitate the adjustments of the boom height, tension of the hoisting rope and the accumulator pressure in the initial setting prior to a vehicle travelling operation, setting the boom accurately at an appropriate travel height with the hoisting rope in an appropriately loosened state to produce the vibration suppressing effects in an appropriate manner while reducing the noises which would otherwise result from swinging movements of the hoisting rope or vibrations of the hook. In addition, the apparatus of the invention which is easy to operate contributes to lessen the mental fatigue of the operator to a considerable degree.

What is claimed is:

1. A mechanism for suppressing vibrations in travel of mobile type crane, comprising:

a vehicle body;

a boom pivotally mounted on said vehicle body;

a boom lifting hydraulic cylinder with a first load-supporting oil chamber and a second opposingly located oil chamber, said cylinder being connected between said vehicle body and said boom of the mobile crane;

a main hydraulic pump;

an auxiliary hydraulic pressure source;

a direction control valve connected between said boom lifting hydraulic cylinder and said main hydraulic pump and comprising means for supplying the discharge oil of said main hydraulic pump selectively to and from said first load-supporting oil chamber and said opposingly located second oil chamber of said boom lifting cylinder;

a vibration suppressing accumulator connected between said boom lifting cylinder and said direction control valve;

a first change-over valve connected between said boom lifting cylinder and said direction control valve and comprising means for selectively switching between a travel mode position for forming a closed circuit through said first and second oil chambers and a working mode position for supplying oil pressure from said direction control valve independently to and from said first and second oil chambers;

a second change-over valve selectively switchable between a travel mode position for communicating said accumulator with said closed circuit and a working mode position for blocking oil flow from said closed circuit to said accumulator;

a boom position detecting means operative to actuate one of said change-over valves when a predetermined position of said boom is detected;

a first selector means for switching on and off oil pressure supply to said oil chamber from an auxiliary oil pressure source; and a second selector means for switching on and off oil pressure supply to said accumulator from an auxiliary oil pressure source.

* * * * *